April 6, 1954
W. GASSERT
2,674,437
VARIABLE POWER STEPLESS TRANSMISSION
Filed Sept. 24, 1947
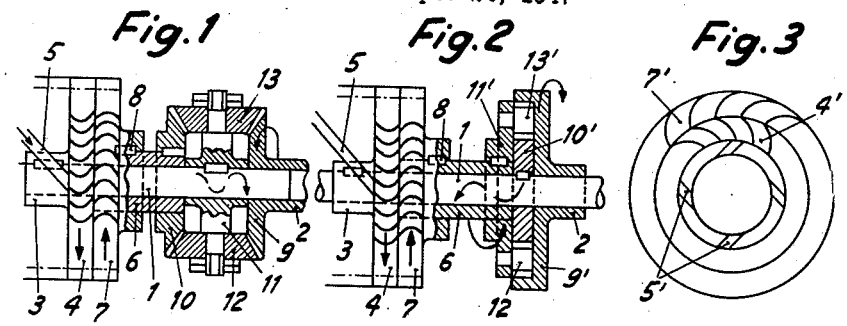
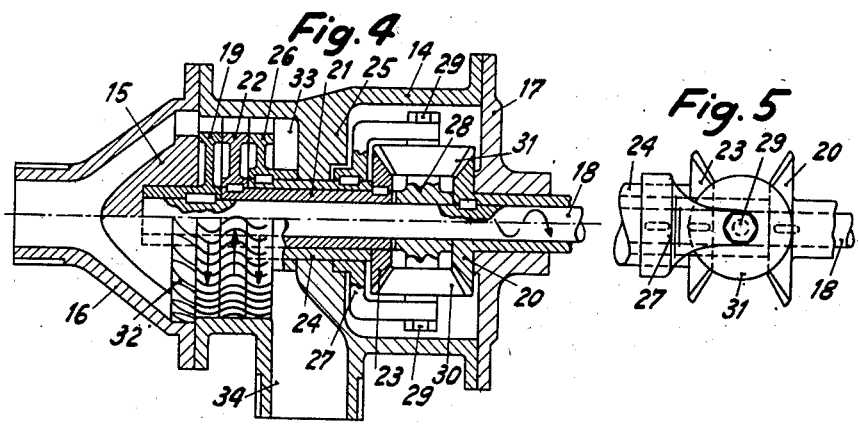
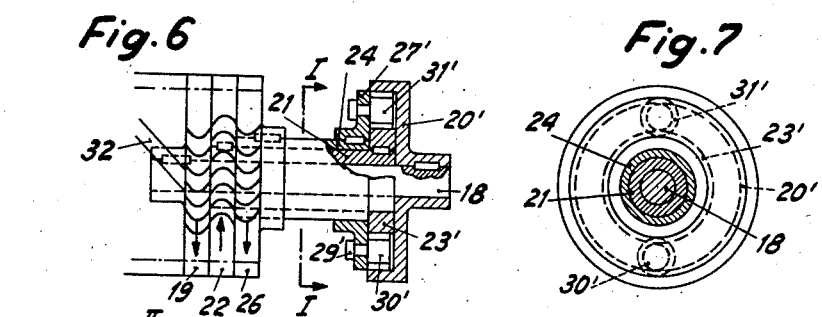
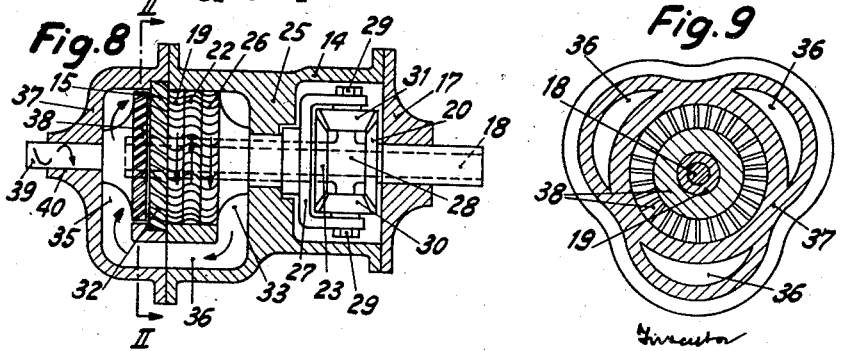
Inventor
Willy Gassert Patented Apr. 6, 1954

2,674,437

UNITED STATES PATENT OFFICE 2,674,437

VARIABLE POWER STEPLESS TRANSMISSION

Willy Gassert, Solothurn, Switzerland

Application September 24, 1947, Serial No. 775,944

Claims priority, application Switzerland May 16, 1947

7 Claims. (Cl. 253—16.5)

This invention relates to a variable torque converter of the type comprising a differential gear and fluid-operated turbine wheels.

It is an object of the invention to generally improve the construction of torque converters of the type referred to so as to provide an article which will be relatively simple in design while being very efficient in use.

With this and other objects in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawing forming part of this application, in which:

Fig. 1 is a first constructional embodiment of the gear showing a combination of turbine and differential gear, partly in axial section, Fig. 2 is a second constructional embodiment of the gear showing a combination of turbine and sun and planet wheel gear, partly in axial section, Fig. 3 is a partial variant of Figs. 1 and 2, Fig. 4 is a third constructional embodiment of the gear again showing a combination of turbine and differential gear in axial section, Fig. 5 is a part top-view of Fig. 4, Fig. 6 is a fourth constructional embodiment of the gear again showing a combination of turbine and sun and planet wheel gear, partly in axial section, Fig. 7 is a cross-section along the line I—I in Fig. 6, Fig. 8 is a fifth constructional embodiment of the gear in which a turbine with a differential gear is combined with a hydraulic pump, Fig. 9 is a cross-section along the line II—II in Fig. 8.

In the case of the first constructional embodiment of the gear shown in Fig. 1, I designates the driving shaft and 2 the driven shaft designed as a hollow shaft. The shaft 2 rotates in a bearing in a turbine case not shown in the drawing, whereas one end of shaft I is supported by the hollow shaft 2 and the other end through the hub 3 of the turbine wheel 4 by a bearing in the turbine case. Against the blades on the circumference of the turbine wheel 4 several nozzles 5 are equally distributed, and direct the driving liquid against the said blades at the most appropriate angle. On the driving shaft I a hollow shaft 6 is rotatably mounted and one end carries a turbine wheel 7 arranged beside the turbine wheel 4 with very slight clearance, which turbine wheel 7 is connected by means of a key 8 to the hollow shaft 6. At the adjacent ends of the hollow shafts 2 and 6 are fitted the bevel wheels 9 and 10 of a differential gear. Between the ends of the hollow shafts 2 and 6 the hub of a wheel bracket 11 is keyed on the driving shaft 1, the axle ends of which wheel bracket carry the rotating bevel wheels 12 and 13 of the differential gear.

The turbine wheel 4 driven by the jets of liquid from the nozzles 5 drives via the shaft 1 the spider 11 keyed thereon in the direction indicated by the arrow. A high load on the driven shaft 2 blocks the spider and the turbine wheel 4 through the gears 9 and 13. The stopped turbine wheel 4 serves as a guiding means for guiding the full kinetic energy of the fluid ejected by the nozzles 5 against the vanes of the turbine wheel 7 which is rotated in the direction of the arrow. Turbine wheel 7 is connected to the driving gear 10. The driving gear 10 acts through the planetary gears 13 on the driven gear means 9 with double the torque that is exerted by the turbine wheel 4. Preferably the vanes of the turbine wheel 7 are shaped in such manner as to produce a slightly higher torque than the turbine wheel 4. When driven gear means 9 starts rotating, the turbine wheel 4 is unlocked and starts rotating in the direction of the arrow so as to cooperate with the turbine wheel 7 to achieve a higher speed. Since, however, rotation of turbine wheel 4 is opposite to the direction of turbine wheel 7 part of the kinetic energy is taken up by the turbine wheel 4 which no longer is stationary. The bevel wheel 10 and the turbine wheel 7 in rotatory connection with it are driven at higher speed than the turbine wheel 4 and should develop approximately 10% more power than the latter, which fact should also be allowed for by appropriate setting of the turbine blades. When the turbine wheel 4 is stationary, the bevel wheel 9 turns at the same speed as the bevel wheel 10. When the turbine wheel 4 turns in the direction indicated by the arrow, the wheel bracket 11 carrying the rotating bevel wheels 12 and 13 also turns with it, the two bevel wheels 9 and 10 being driven in the opposite direction of rotation and the bevel wheel 9 turning at higher speed than the bevel wheel 10 since the rotary speed of the spider 11 is added to the rotary speed of the bevel wheels 12 and 13.

The constructional embodiment of the gear shown in Fig. 2 differs from the first constructional embodiment only in that a sun and planet wheel gear is used as a differential unit. The parts of the sun and planet wheel gear corresponding to the parts 9—13 of the differential gear used in Fig. 1 are marked as 9'—13'. The mode of operation of this gear is approximately the same as that described in connection with Fig. 1.

With the first two constructional embodiments the radial turbine shown in Fig. 3 can also be used instead of an axial turbine. In this turbine the nozzles are marked 5' and the turbine wheels 4' and 7'.

Fig. 4 shows a gear in which the turbine combined with a differential gear has three rotors. The gear-case 14 is open on two sides and provided with flanges. One aperture of the case is closed by a conical bearing cap 15 which is held in position by means of an inlet connecting branch 16. The other aperture of the case is sealed by a bearing cap 17 provided with bearing brackets. The driven shaft 18, one end of which carries a keyed-on rotor 19 is mounted with the hollow hub of the latter in a bearing bore of the conical part of the bearing cap 15, whereas its other end carries a keyed-on bevel wheel 20 and is rotatably mounted with the hollow hub of the latter in the bearing bracket of the bearing cap 17. On the centre of the driven shaft 18 is rotatably mounted a hollow shaft 21 on the one end of which a rotor 22 arranged beside the rotor 19 with very slight clearance is keyed, while its other end carries a bevel wheel 23 keyed thereto and opposite the bevel wheel 20. On the hollow shaft 21 is rotatably mounted a further hollow shaft 24 which passes through a bearing bore in a partition 25 of the gear case, and carries at its one end the rotor 26 lying with very slight clearance beside the rotor 22, a wheel bracket 27 with two bearing arms being keyed on the end which lies at the other side of the partition. On the driven shaft 18 a bearing arm 28 is rotatably mounted between the bevel wheels 20 and 23 at right-angles to the shaft 18, which bearing arm has two bearing ends pointing in opposite directions. In the bearing arms of the wheel bracket 27 and in the bearing ends of the bearing arm 28 two rotating bevel wheels 30 and 31 are mounted opposite each other on axle screws 29 so as to engage with the bevel wheels 20 and 23. These bevel wheels 30 and 31 form together with their wheel bracket and the bevel wheels 20 and 23 the differential gear. On the circumference of the bearing cap 16 slot-shaped nozzles 32 are fashioned which are directed at an angle appropriate for normal delivery towards the blades of the rotor 19. The pressure liquid entering through the inlet connecting branch flows successively through the blades of the rotors 19, 22 and 26, after which it arrives in an exhausted state in the collector 33 and escapes through the exhaust connecting branch 34 in the gear case.

The mode of operation of this constructional embodiment is similar to that of the examples previously described. When great load is placed upon the bevel wheel 20 the liquid flowing out of the nozzles 32 cannot drive the rotor 19 rigidly connected to the bevel wheel 20. The jets of liquid are thus deflected by the blades of the rotor 19 and directed to the blades of the next rotor 22, which is rigidly connected to the bevel wheel 23. As the rotor 22 has about 10% higher driving torque than the rotor 26, the bevel wheel 23, rigidly connected to rotor 22, turned in the direction of the arrow marked on the rotor 22. If the turbine wheel 26 is at a standstill, the spider 27 does not move and the bevel wheels 30, 31 driven by the bevel wheel 23 rotate about their axes to drive the bevel gear 20. At the first stage of the operation the bevel wheel 20 is blocked by the load and the turbine wheel 22 will exert through bevel wheel 23, and bevel wheels 30, 31 a strong torque on bevel gear 20. As bevel wheel 20 starts rotating, the load is reduced, and the speed of the rotor 26 rigidly connected to the wheel bracket 27 also decreases until it comes to a standstill and then begins to turn in the direction of the arrow marked on it, whereby the speed of the bevel wheel 20 under load is increased.

In the case of the constructional embodiment shown in Figs. 6 and 7 we have a gear operating in essentially the same manner as that shown in Figs. 4 and 5. The turbine case is not shown here. This gear differs essentially from the former only in that a sun and planet wheel gear is used as the differential gear. The corresponding parts are therefore here provided with the same reference numbers and the parts corresponding in their operation to the parts of the differential gear 20, 23, 27, 29, 30 and 31 bear the reference numbers 20', 23', 27', 29', 30' and 31'.

The variable torque converter shown in Figs. 6 and 7 operate as follows:

The driving fluid is admitted to the first turbine wheel 19 through a nozzle 32. This first turbine wheel is fixedly mounted on the load shaft 18 so that the kinetic energy absorbed by this turbine wheel is directly transmitted to the load shaft 18 which moreover, carries the outer, internally toothed gear wheel 20' of the planetary gear 20', 23', 30'. The driving fluid passed through the turbine wheel 19 and deflected accordingly will act upon the second turbine wheel 22 which is fixedly mounted on a hollow power shaft 21 rotatably mounted on load shaft 18 and carrying the inner gear wheel 23' of the planetary gear. This rotary unit 22, 21, 23' therefore will rotate in an opposite direction of the rotary unit 19, 18, 20'. The driving fluid leaving the turbine wheel 22 will act upon the third turbine wheel 26, after it has been deflected once more by the blades of turbine wheel 22, in such a way that the turbine wheel 26 is caused to rotate in the same direction as turbine wheel 19. The turbine wheel 26 is fixedly mounted on a hollow power shaft 24 mounted for rotation on shaft 21 and carrying the planet "cage" in the form of a revoluble carrier 27' for the planet wheels 30' and 31' which are rotatably mounted therein. The blades of the three turbine wheels are arranged and shaped in such a way that the turbine wheel 22 will be driven at a higher speed and with a higher torque than the turbine wheel 26, the excess of torque preferably being 10 percent.

It will thus be understood that the torque transmitted to the load shaft 18 will automatically adapt itself to the load tending to prevent rotation of shaft 18. As the load grows, the speed of turbine wheel 19 will be reduced and a greater part of the kinetic energy of the driving fluid will be transmitted to the turbine wheels 22 and 26, respectively, through which the torque is transmitted to shaft 18 with a reduction of speed corresponding to the size of the various gear wheels. Thus, all the turbine wheels and gear wheels remain in action under any conditions of operation. In other words, all of the said elements are fully inserted in the "flow of power" under all and any conditions of operation as to torque and speed.

The constructional embodiment of the gear shown in Figs. 8 and 9 differs from the gear exemplified in Figs. 4 and 5 only in that a hydraulic pump is installed in the space for the turbine, by which pump the liquid driving the turbine wheels is set in circulation in the turbine. The collector 33 on the exhaust side of the turbine formed by the three rotors 19, 22 and 26 and the bearing cap 15 with the nozzle rim 32 is connected to a collector 35 on the inlet side of the turbine by connecting channels 36. These connecting channels are provided both in the part of the case which encloses the turbine and in the bearing cap 37 which carries the bearing cap 15 and is screwed on a flange of the case 14. As a hydraulic pump, a turbine wheel 38 with slanting blades on its circumference is used. This turbine lies with very slight clearance next to the nozzle rim 32 of the bearing cap 15, and is rotatably mounted by means of a driving shaft 39 in a bearing bore 40 of the bearing cap 37. When the hydraulic pump is driven, e. g. by an electric motor coupled to the driving shaft 39, the motive liquid is set in circulation in the direction indicated by the arrows thus driving the turbine. In other respects the mode of operation of the gear is exactly the same as in the constructional embodiment illustrated in Figs. 4 and 5.

While the form of embodiment of the invention as herein disclosed, constitutes a preferred form, it is to be understood that some changes may be made in the arrangement, construction and combination of the various parts of my invention, and it is my intention to cover by my claims such changes as may reasonably be included within the scope thereof.

I claim as my invention:

1. A turbine drive arrangement, comprising, in combination, a first turbine wheel having a set of first deflecting vanes; fluid ejecting means urging said first turbine wheel to rotate in one direction, said fluid ejecting means being located opposite one set of ends of said first deflecting vanes so that fluid ejected by said ejecting means passes from said one set of ends of said first vanes to the other set of ends of said first vanes and is thereby deflected; a second turbine wheel cooperating with said first turbine wheel and having a set of second deflecting vanes, one set of ends of said second vanes being located opposite said other set of ends of said first deflecting vanes so that fluid deflected by said set of first deflecting vanes is thrown against said set of second vanes for driving said second turbine wheel in the opposite direction; a driven shaft; and a differential gear unit including a driven gear means fixedly connected to said driven shaft, driving gear means fixedly connected to one of said turbine wheels for rotation therewith, spider means fixedly connected to the other turbine wheel for rotation therewith, and planetary gear means rotatably mounted on said spider means and meshing with said driven gear means and said driving gear means whereby said one turbine wheel acts with a greater force on said driven shaft than said other turbine wheel causing rotation of said driven shaft while said other turbine wheel is blocked by a load on said driven shaft, both said turbine wheels cooperating to increase the speed of said driven shaft.

2. A turbine drive arrangement, comprising, in combination, a first turbine wheel having a set of first deflecting vanes; fluid ejecting means urging said first turbine wheel to rotate in one direction, said fluid ejecting means being located opposite one set of ends of said first deflecting vanes so that fluid ejected by said ejecting means passes from said one set of ends of said first vanes to the other set of ends of said first vanes and is thereby deflected; a second turbine wheel cooperating wtih said first turbine wheel and having a set of second deflecting vanes, one set of ends of said second vanes being located opposite said other set of ends of said first deflecting vanes so that fluid deflected by said set of first deflecting vanes is thrown against said set of second vanes for driving said second turbine wheel in the opposite direction; a driven shaft; a differential gear unit including driving gear elements driven by said second turbine wheel, planetary gear means meshing with said driving gear element, and driven gear means operatively connected with and driving said driven shaft; and connecting shaft means connecting said first turbine wheel and one of said gear means for rotation, said turbine wheels cooperating to increase the speed of said driven shaft.

3. A turbine drive arrangement, comprising, in combination, a first turbine wheel having a set of first deflecting vanes; fluid ejecting means urging said first turbine wheel to rotate in one direction, said fluid ejecting means being located opposite one set of ends of said first deflecting vanes so that fluid ejected by said ejecting means passes from said one set of ends of said first vanes to the other set of ends of said first vanes and is thereby deflected; a second turbine wheel cooperating with said first turbine wheel and having a set of second deflecting vanes, one set of ends of said second vanes being located opposite said other set of ends of said first deflecting vanes so that fluid deflected by said set of first deflecting vanes is thrown against said set of second vanes for driving said second turbine wheel in the opposite direction; a driven shaft; and a differential gear unit including a driven gear means fixedly connected to said driven shaft, driving gear means fixedly connected to said second turbine wheel for rotation therewith, spider means fixedly connected to said first turbine wheel for rotation therewith, and planetary gear means rotatably mounted on said spider means and meshing with said driven gear means whereby said second turbine wheel acts with a greater force on said driven shaft than said first turbine wheel causing rotation of said driven shaft when said first turbine wheel is blocked by a load on said driven shaft, said turbine wheels cooperating to increase the torque on said driven shaft.

4. A turbine drive arrangement, comprising, in combination, a first turbine wheel having a set of first deflecting vanes; fluid ejecting means urging said first turbine wheel to rotate in one direction, said fluid ejecting means being located opposite one set of ends of said first deflecting vanes so that fluid ejected by said ejecting means passes from said one set of ends of said first vanes to the other set of ends of said first vanes and is thereby deflected; a second turbine wheel cooperating with said first turbine wheel and having a set of second deflecting vanes, one set of ends of said second vanes being located opposite said other set of ends of said first deflecting vanes so that fluid deflected by said set of first deflecting vanes is thrown against said set of second vanes for driving said second turbine wheel in the opposite direction; a third turbine wheel having a set of third vanes, one set of ends of said third vanes being located opposite the other set of ends of said second vanes so that fluid deflected by said set of second deflecting vanes is thrown against said set of third vanes for driving said third turbine wheel in the direction of said first turbine wheel; a driven shaft fixedly connected to said first turbine wheel for rotation therewith; and a differential gear unit including a driven gear means fixedly connected to said driven shaft for rotation therewith, driving gear means fixedly connected to said second turbine wheel for rotation therewith, spider means fixedly connected to said third turbine wheel for rotation therewith, and planetary gear means rotatably mounted on said spider means and meshing with said driven gear means and said driving gear means whereby said second turbine wheel acts with a greater force on said driven shaft than said first and third turbine wheels causing rotation of said driven shaft against the action of a load on said driven shaft.

5. A turbine drive arrangement, comprising, in combination, a first turbine wheel having a set of first deflecting vanes; rotary impeller wheel means having impeller vanes; stationary guiding nozzle means located between said impeller vanes and opposite one set of ends of said first deflecting vanes so that fluid ejected by said impeller wheel means passes through said nozzle means and then from said one set of ends of said first vanes to the other set of ends of said first vanes and is thereby deflected; a second turbine wheel cooperating with said first turbine wheel and having a set of second deflecting vanes, one set of ends of said second vanes being located opposite said other set of ends of said first deflecting vanes so that fluid deflected by said set of first deflecting vanes is thrown against said set of second vanes for driving said second turbine wheel in the opposite direction; a third turbine wheel having a set of third vanes one set of ends of said third vanes being located opposite the other set of ends of said second vanes so that fluid deflected by said set of second deflecting vanes is thrown against said set of third vanes for driving said third turbine wheel in the direction of said first turbine wheel; a driven shaft fixedly connected to said first turbine wheel for rotation therewith; and a differential gear unit including a driven gear means fixedly connected to said driven shaft for rotation therewith, driving gear means fixedly connected to said second turbine wheel for rotation therewith, spider means fixedly connected to said third turbine wheel for rotation therewith, and planetary gear means rotatably mounted on said spider means and meshing with said driven gear means and said driving gear means whereby said second turbine wheel acts with a greater force on said driven shaft than said first and third turbine wheels causing rotation of said driven shaft against the action of a load on said driven shaft.

6. A turbine drive arrangement, comprising, in combination, a first turbine wheel having a set of first deflecting vanes; fluid ejecting means urging said first turbine wheel to rotate in one direction, said fluid ejecting means being located opposite one set of ends of said first deflecting vanes so that fluid ejected by said ejecting means passes from said one set of ends of said first vanes to the other set of ends of said first vanes and is thereby deflected; a second turbine wheel cooperating with said first turbine wheel and having a set of second deflecting vanes, one set of ends of said second vanes being located opposite said other set of ends of said first deflecting vanes so that fluid deflected by said set of first deflecting vanes is thrown against said set of second vanes for driving said second turbine wheel in the opposite direction, said set of second deflecting vanes being designed and shaped in such manner that said second turbine wheel is driven at a higher speed and with a higher torque than said first turbine wheel; a driven shaft; and a differential gear unit including a driven gear means fixedly connected to said driven shaft, driving gear means fixedly connected to said second turbine wheel for rotation therewith, spider means fixedly connected to said first turbine wheel for rotation therewith, and planetary gear means rotatably mounted on said spider means and meshing with said driven gear means whereby said second turbine wheel acts with a greater force on said driven shaft than said first turbine wheel causing rotation of said driven shaft when said first turbine wheel is blocked by a load on said driven shaft.

7. A turbine drive arrangement, comprising, in combination, a first turbine wheel having a set of first deflecting vanes; fluid ejecting means urging said first turbine wheel to rotate in one direction, said fluid ejecting means being located opposite one set of ends of said first deflecting vanes so that fluid ejected by said ejecting means passes from said one set of ends of said first vanes to the other set of ends of said first vanes and is thereby deflected; a second turbine wheel cooperating with said first turbine wheel and having a set of second deflecting vanes, one set of ends of said second vanes being located opposite said other set of ends of said first deflecting vanes so that fluid deflected by said set of first deflecting vanes is thrown against said set of second vanes for driving said second turbine wheel in the opposite direction; a third turbine wheel having a set of third vanes, one set of ends of said third vanes being located opposite the other set of ends of said second vanes so that fluid deflected by said set of second deflecting vanes is thrown against said set of third vanes for driving said third turbine wheel in the direction of said first turbine wheel, said three sets of vanes being designed and shaped in such manner that said second turbine wheel is driven at a higher speed and with a higher torque than the other turbine wheels; a driven shaft fixedly connected to said first turbine wheel for rotation therewith; and a differential gear unit including a driven gear means fixedly connected to said driven shaft for rotation therewith, driving gear means fixedly connected to said second turbine wheel for rotation therewith, spider means fixedly connected to said third turbine wheel for rotation therewith, and planetary gear means rotatably mounted on said spider means and meshing with said driven gear means and said driving gear means whereby said second turbine wheel acts with a greater force on said driven shaft than said first and third turbine wheels causing rotation of said driven shaft when said first turbine wheel is blocked by a load on said driven shaft.

(References on following page)

References Cited in the file of this patent

UNITED STATES PATENTS

| Number | Name | Date |
|---|---|---|
| 1,271,079 | Radcliffe | July 2, 1918 |
| 1,398,124 | Cake | Nov. 22, 1921 |
| 1,473,487 | McCarthy | Nov. 6, 1923 |
| 1,777,428 | Charliss | Oct. 7, 1930 |
| 1,855,222 | Chase | Apr. 26, 1932 |
| 1,937,002 | Weihmann | June 28, 1933 |
| 2,055,895 | Fawcett | Sept. 29, 1936 |
| 2,085,668 | Mueller | June 9, 1937 |
| 2,113,515 | Mountgrand | Apr. 5, 1938 |
| 2,153,997 | Verderber et al. | Apr. 11, 1939 |
| 2,154,460 | Lawrence | Apr. 18, 1939 |
| 2,155,198 | Lawrence | Apr. 18, 1939 |
| 2,171,146 | Montelius | Aug. 29, 1939 |
| 2,177,302 | Lawrence | Oct. 24, 1939 |
| 2,188,546 | Thiesen | Jan. 30, 1940 |
| 2,203,177 | Patterson | June 4, 1940 |
| 2,209,367 | Watson | July 30, 1940 |
| 2,292,079 | Joyce | Aug. 4, 1942 |
| 2,316,390 | Biermann | Apr. 13, 1943 |
| 2,318,660 | Barrett | May 11, 1943 |
| 2,318,990 | Doran | May 11, 1943 |
| 2,472,878 | Baumann | June 14, 1949 |